United States Patent [19]

Ivenbaum

[11] 3,713,092
[45] Jan. 23, 1973

[54] AIR PRESSURE BALANCED SELF-CONTAINED TIRE PRESSURE CONDITION SIGNAL TRANSMITTER

[76] Inventor: Bernard Ivenbaum, 2319 Ocean View Avenue, Apt. 25, Los Angeles, Calif. 90057

[22] Filed: Oct. 23, 1970

[21] Appl. No.: 83,515

[52] U.S. Cl. ..................340/58, 73/49, 73/146.5
[51] Int. Cl. .............................................B60c 23/04
[58] Field of Search......340/58; 200/61.25, 83, 82 R, 200/81.4, 82 D; 73/405, 407 R, 146.8, 49, 419, 146.5

[56] References Cited

UNITED STATES PATENTS

| 1,777,213 | 9/1930 | Magill | 200/82 D |
| 3,533,063 | 10/1970 | Garcia | 340/58 |
| 3,430,196 | 2/1969 | Dalton | 340/58 |
| 2,566,704 | 9/1951 | Leibing | 200/83 |

Primary Examiner—John W. Caldwell
Assistant Examiner—Glen R. Swann, III
Attorney—Allan D. Mockabee

[57] ABSTRACT

This invention relates to a fluid pressure alarm for use primarily on vehicle tires including a self-contained powered radio transmitter in a cylindrical housing threaded on the inflation stem of the vehicle tire, the housing having means maintaining pressure communication between the interior of the tire and that of the housing, and a pressure responsive switch device biased by control pressure in a control pressure compartment of the housing and movable to energize the transmitter upon a predetermined pressure differential between that of the control compartment and that of the vehicle tire, the radio signal to be picked up by a receiver in the cab of the vehicle. it can be used as a pressure differential alarm on other pressurized gas or liquid environments.

1 Claim, 3 Drawing Figures

PATENTED JAN 23 1973
3,713,092
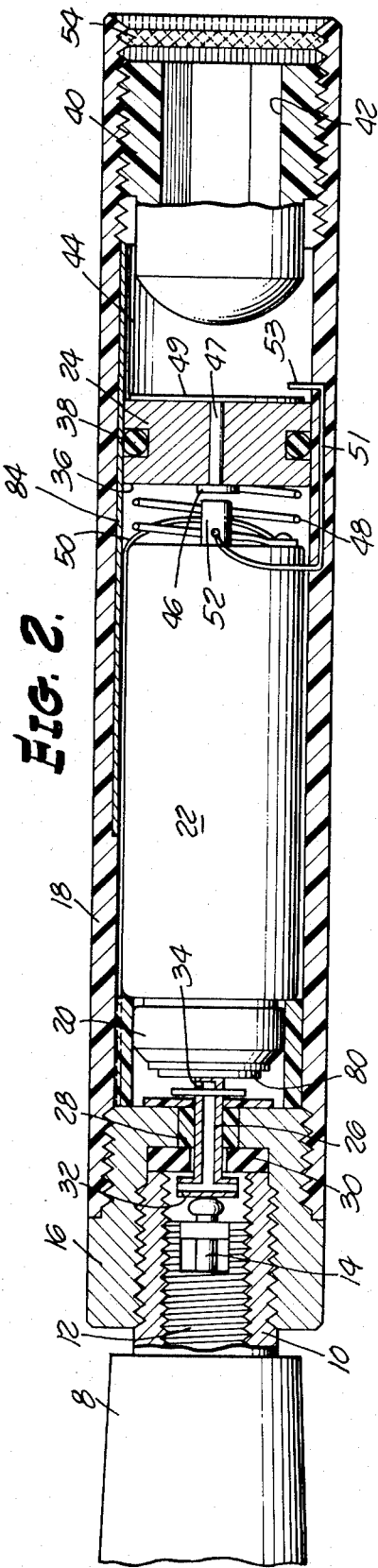
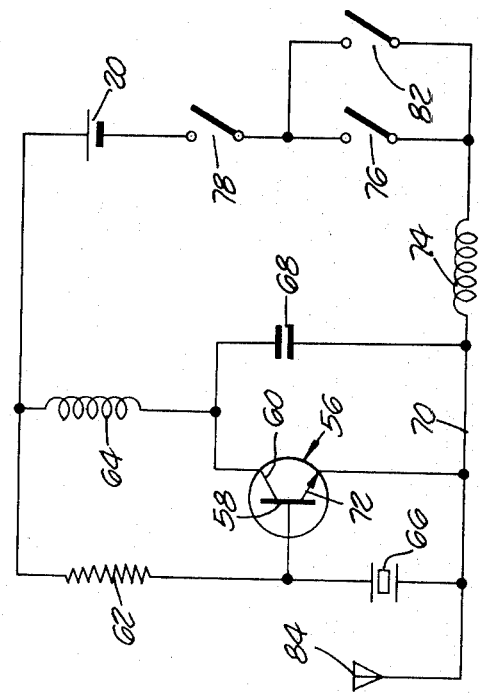
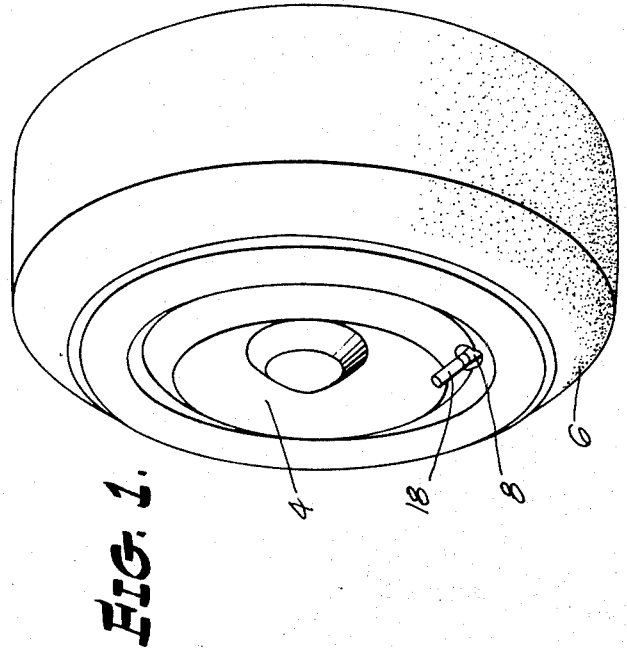
INVENTOR
BERNARD IVENBAUM
BY
Albert D. Huckabee
ATTORNEY

AIR PRESSURE BALANCED SELF-CONTAINED TIRE PRESSURE CONDITION SIGNAL TRANSMITTER

This invention relates to a low pressure alarm for vehicle tires particularly adaptable for use by large multi-wheeled truck units, but of course adaptable for use on passenger vehicles, aircraft and the like.

Various types of low pressure alarms have been conceived heretofore. One type includes a switch operated by lessening of tire pressure or by bulging of the side wall of the tire to close an electrical circuit to an alarm device in the vehicle. These wired circuits all of course required some sort of slip ring connection between the rotating wheel and the relatively stationary frame and body. These were subject to considerable wear in a short time and were often affected by dirt and moisture.

Another type of device comprised a radio transmitter having a wired connection to a pressure switch mounted on the valve stem, the transmitter being mechanically mounted in some fashion on the rim or wheel of the vehicle. This type of construction was subject to damage because of its mounting on the wheel and its wired connections to the transmitter on the valve stem. Furthermore, unless the transmitter was weather-proofed in some manner, it was subject to shorting because of the exposed electrical leads thereon. This type of device required removal of the ordinary valve element in the vehicle tire stem and mounting of a counterpart in a specially constructed portion of the alarm unit.

Still another type provided a transmitter to be mounted as a whole on the valve stem, but its construction was such that it was cumbersome and in actual practice, broke off of the stem. It was subject to shorting when used in wet weather, particularly in winter when salt was spread on the streets and roads in Northern climates. Furthermore, this type depended upon a pressure differential between internal tire pressure and that of the atmosphere. Inasmuch as atmospheric pressure is quite variable, the device could not function with any degree of reliability. It also required reconstruction of the vehicle valve stem.

A need has been present for many years for a relatively simple and economical, yet highly reliable, tire pressure alarm device. Particularly in the case of large truck or tractor trailer units with multiple tires, it is very difficult, if not impossible, to tell when one of a dual set of tires has lost some or all of its pressure. When pressure begins to reduce in one tire and it can be determined reliably, the vehicle can be brought to a safe stop. However, when most or all of the pressure is spent, the tire can become overheated and disintegrate, causing loss of control. At other times where the load is great, the loss of pressure in one of a dual set of tires will cause the other tire to blow out, and jackknifing and excessive swerving or other loss of control will result in severe accidents endangering the lives of truckmen and those of other drivers nearby, as well as large property losses. An efficient and reliable alarm device is therefore of considerable importance to truck drivers organizations and to employers.

It is therefore a general object of the invention to provide a tire pressure alarm device in which the alarm signal is transmitted by radio to the cab of the vehicle wherein the alarm device is compact, can be installed merely by threading it upon the inflation stem of a conventional vehicle tire without any alterations to said stem; and wherein the device is housed in a cylinder which, due to present day miniaturization, can be made approximately the diameter of a truck tire inflation stem and a length approximately the same as that of the stem. It is unaffected by changes in atmospheric pressure and can be simply and easily adjusted so that when the vehicle tire is properly inflated, the alarm will operate reliably and accurately. Pressure responsive springs are eliminated and a control pressure compartment with a unique pressure adjustment means is incorporated in the small cylindrical housing.

The above and other objects and advantages of the invention will more fully appear from the following description in connection with the accompanying drawing:

FIG. 1 is a perspective view of a vehicle wheel and tire with an embodiment of the invention shown thereon;

FIG. 2 is an enlarged longitudinal sectional view through the device and a portion of a vehicle tire air filler stem;

FIG. 3 is a diagram of the transmitter circuit.

There is illustrated a vehicle wheel 4 having a pneumatic tire 6 provided with an air filler stem 8. The filler stem 8 has a reduced outer portion 10 internally threaded to receive the threaded casing 12 of a filler valve having a movable stem 14. Conventionally, when the valve stem 14 is pressed inwardly, the valve is opened to permit air under pressure to be introduced into the tire or to release air therefrom.

Threaded on the outside of the reduced portion 10 is a coupling member 16 and upon it is threaded a tubular housing 18, the latter preferably being made of a nonconducting material, such as a suitable plastic. Located in the housing 18 is an electric battery 20, a radio transmitter 22, and a single unit sliding piston switch 24, these elements all being in alignment, as shown. The battery 20 is in electrical contact with the end of the transmitter 22 and the other side of the battery is in contact with a metallic tube 26 extending through collar 28 and a washer 30, the stem at its left end being provided with a tee head 32 adapted for engaging the end of the valve stem 14, as shown. The tee head is hollow and in flow communication with the tube, the latter at its right end having a port 34 so that air under pressure from the vehicle tire can flow through the tee head 32, the tube 26, and into the interior of the housing 18 whence it can flow to the right past the battery 20 and transmitter 22 to impose the pressure of the pneumatic tire 6 on the face 36 of the piston switch device 24. The piston switch element 24 is provided with an O-ring packing 38 to prevent air leakage from one side of the piston to the other.

The right or outer end of the housing 18 is provided with internal threads as shown to threadedly receive a plug 40 having a polygonal socket 42 to receive a suitable wrench. The plug 40 is also of a suitable plastic material so that the interengaging threads of the housing in the plug form a seal against the leakage of air from a pressure control compartment 44 located between the plug 40 and the piston valve element 24. When the plug 40 is screwed into the housing, it creates pressure in the compartment 44, or until the device is connected to the vehicle tire, it provides an air chamber in which the air will be compressed when pressure from the tire is introduced to the left of the piston valve element 24. Since the degree of threading of the plug 40 into the housing 18 determines the size of the air pressure control chamber or compartment 44, variations of the position of the plug 40 can be utilized to provide a resultant pressure in the compartment or control pressure chamber 44 which will balance the air pressure in the other portion of the housing 18 with the piston switch element 24 approximately in the position shown relative to the transmitter 22. This positioning or setting of the piston switch 24 is desired for the reason that a contact disc 46 on the left side of the piston 24 is connected to a helical wire 48 which is supplied with current from the battery through lead wire 50 connected to the end plug 16 of the housing which in turn is connected to the threaded inflation stem 10, inflation valve 14 and tube 26 to one side of the battery 20. The contact disc 46 is maintained normally in slightly spaced relation to a contact pole 52 which leads to one side of the circuit of the transmitter 22. In order to maintain the desired spacing between the contact disc 46 and the contact pole 52, there is provided the adjustable pressure plug 40.

The contact disc 46 is mounted on one end of a pin 47 which extends through the piston switch element 24 and has secured at its other end a larger contact disc 49. A wire 51 is mechanically and electrically secured to the contact pole 52 and has a portion extending longitudinally in the side wall of the housing 18 and terminates in a contact end 53 to the right of the contact disc 49 as viewed in FIG. 2. In the event of an increase in pressure in the vehicle tire due to tire road friction and increases in atmospheric temperature, the piston valve element 24 will move to the right, engaging the contact end 53 of the conductor 51 and energize the transmitter.

For convenience in determining the pressure setting relative to the pressure of the tire upon which the device is to be used, certain of the convolutions of the internal threads in the right end of the housing 18 can be color coded as indicated by the color convention 54 shown in one of the thread convolutions. Other colors can be used on convolutions to indicate different pressures. FIG. 3 shows one type of transmitter which might be used. There is shown a crystal 66 connected to a transistor 56 whose base 58 and collector 60 are respectively connected through resistor 62 and coil 64 to one side of the battery 20. The collector 60 is also connected to one side of a condenser 68, the other side of which is connected to a line 70 leading from the crystal 66 and the emitter 72 of the transistor through a coil 74 and a pair of switches 76 and 78 to the other side of the battery 20. The switch 76 may comprise a contact disc 80 on the battery 20 and the hollow tube 26 which conducts through the tube and the tee head 72, the valve stem assembly, the threaded housing end 16 and conductor 50, and the switch 78, may comprise the contact disc 46 and contact pole 52 of FIG. 1.

A switch 82, indicated in FIG. 3, is one in parallel with the switch 76. In FIG. 2 said switch 82 is made up of the contact disc 49 and contact end 53 of the conductor 51, this switch being the one to energize the transmitter when air pressure in the vehicle tire is too great.

Extending along the inside of the tubular housing 18 is a metal strip 84 which, as indicated in FIG. 3, comprises the antenna for the transmitter 22.

It will be seen that I have provided a highly efficient, reliable and relatively inexpensive device for emitting a signal of a precise frequency, governed by the crystal 66 for the short range needed to reach a receiver which may conveniently be located in the cab of the vehicle on which the wheel 4 is mounted. The housing 18 with its threaded end member 16 contains all of the elements of the signaling device including the tire valve position controller, the balance pressure arrangement and the pressure responsive transmitter. It is of course to be understood that when pressure in the vehicle tire is reduced through leakage, pressure in the pressure control compartment 44 will urge the piston switch member 24 to the left to engage contacts 46 and 52 and energize the transmitter. The transmitter will remain in operation until the operator of the vehicle comes to a stop and either removes the entire unit from the inflation stem portion 10, or moves the pressure adjustment plug 40 outwardly relative to the housing 18. The simplest way to cut off the transmitter is merely to unscrew the entire alarm assembly. As soon as the device is removed from the tire valve element 10, the tee shaped tube element 26 and the housing end member 16 are no longer connected by the otherwise intervening filler valve stem portion 10 and the electrical circuit is broken.

The adjustable pressure plug 40 provides a device which can be used on vehicle tires having different inflation pressures, and these pressures can be counterbalanced in setting the alarm device merely by rotation of the plug 40 until the outer end of said plug coincides with an appropriately color coded portion, such as the portion 54.

With present day miniaturization methods, the entire device can be made two or three inches long and its diameter can approximate that of the valve inflation stem portion 8. The result is the weight of the device is quite negligible so that it will not become dislodged by tire movement due to the unevenness of the road and the housing 18 and its plug 40, being of plastic, render the device quite weather-proof. Miniature batteries have been developed to the extent that they have quite long lives and the disc-like battery, such as the battery 20, are readily obtainable. The use of the transistor 56 also facilitates size reduction while the crystal 66 insures stability of frequency so that the transmitted signal will be properly received by a constantly tuned receiver.

It should of course be understood that various changes can be made in the form, details, arrangement and proportions of the various parts without departing from the spirit of the invention.

I claim:

1. A tire pressure alarm for use on the valved inflation stem of a vehicle tire, wherein the improvement comprises: an elongated housing having means for securing it on a vehicle tire inflation stem, a radio transmitter and a circuit therefor including a battery in said housing, a sealed control chamber in said housing having pressurized atmospheric air therein to substantially match the temperature response characteristics of the air in the vehicle tire, said control chamber including means adjustable to selectively preset the pressure of the air therein to the optimum pressure in the vehicle tire, and a circuit maker in the housing in said transmitter circuit and including means responsive to the pressures in said control chamber in the vehicle tire operable to close the transmitter circuit responsive to positive and negative air pressure differentials in the vehicle tire.

* * * * *